United States Patent
Edwards et al.

[15] 3,705,696
[45] Dec. 12, 1972

[54] FILMSTRIP AND FILMSTRIP RETENTION DEVICE

[72] Inventors: Evan A. Edwards, Pittsford; Richard H. VanDuzer, Rochester, both of N.Y.

[73] Assignee: Eastman Kodak Company, Rochester, N.Y.

[22] Filed: Nov. 15, 1971

[21] Appl. No.: 198,539

[52] U.S. Cl. ............... 242/71.2, 242/188, 242/197, 226/55
[51] Int. Cl. ............................................. G03b 1/04
[58] Field of Search ............... 226/2, 55, 56, 57, 58; 242/71.1, 71.2, 197, 188

[56] References Cited

UNITED STATES PATENTS 3,614,012  10/1971  Ejelmaw ........................ 242/71.2

Primary Examiner—Richard A. Schacher
Assistant Examiner—Gene A. Church
Attorney—William T. French et al.

[57] ABSTRACT

An elongate strip of web material arranged for advancement through a web guiding mechanism, such as a film cartridge, carries a perforation defining an elongated edge that is skewed with respect to the longitudinal axis of the strip. The cartridge includes a protrusion situated to engage initially the skewed edge to stop the advance of the web. Attempts to further advance the web will cause the web face adjoining the skewed edge to conformably engage an undercut surface of the protrusion to prevent further advancement without tearing the web.

13 Claims, 7 Drawing Figures

PATENTED DEC 12 1972

3,705,696

EVAN A. EDWARDS
RICHARD H. Van DUZER
INVENTORS

BY Robert T. Cody

ATTORNEY

FILMSTRIP AND FILMSTRIP RETENTION DEVICE

CROSS REFERENCE TO RELATED APPLICATION

Reference is made to commonly assigned copending U.S. Pat. application, Ser. No. 63,879, entitled "Film Cartridge for Preventing the End of a Filmstrip from Entering a Cartridge Chamber" filed in the name of Willis L. Stockdale.

BACKGROUND OF THE INVENTION

1. Field of the Invention

The present invention relates to an improved system for halting the advance of a strip of material. More particularly, it relates to the use of a special design for a protrusion that is adapted to halt the advancement of a photographic filmstrip through a film cartridge.

2. Description of the Prior Art

The above-cited copending U.S. Pat. application, Ser. No. 63,879 describes a system for preventing the end of a filmstrip from passing a predetermined point during advancement of the filmstrip through a film cartridge. In a conventional manner, one end of the filmstrip is attached to a take-up core which is housed in a take-up chamber of the cartridge and which is rotated by a drive mechanism in a camera to draw the filmstrip across an exposure station. Metering apparatus in the camera successively registers each of the respective filmstrip image areas for exposure at the exposure station. The above-cited application teaches the provision in such a system of a generally rectangular perforation adjacent the trailing end of the filmstrip to squarely engage a vertical facet of a ramp-shaped tooth provided on the cartridge to prevent the trailing end of the filmstrip from being completely drawn into the take-up chamber after all image areas have passed the exposure station. This arrangement not only retains the trailing portion of the filmstrip in the take-up chamber access slit so as to form a light lock, but also assures that the filmstrip end will be externally accessible for extraction of the filmstrip from the take-up chamber for processing so as to eliminate the need to break open the take-up chamber.

Although the above-described combination of tooth-and-perforation has proved advantageous, it has been found that, if too much force is applied to the filmstrip subsequent to engagement of the tooth within the perforation, the web material will tear, thereby freeing the filmstrip from the tooth and allowing the filmstrip to be, undesirably, wound fully into the take-up chamber. That is, in such prior art system the web-advancing force was borne solely by the web edge and was particularly concentrated at the corners of the perforation with the result that a relatively small amount of force could tear the web and allow it to escape from the tooth. A need has existed, therefore, for a tooth-and-perforation system that would withstand a fairly large force, yet would retain the basic simplicity and compactness of the arrangement of U.S. application, Ser. No. 63,879.

SUMMARY OF THE INVENTION

It has been found, in a web engaging system such as that described above, that by skewing the tooth engaging edge of the perforation with respect to the longitudinal web axis, the tendency for the filmstrip to tear in response to a large "advance" force is virtually eliminated.

In accordance with the invention in its presently preferred form, the skewed discontinuity has been found especially useful when taken in combination with a specially undercut retention tooth which serves to cause a portion of the web face to wrap around the undercut tooth and, by so doing, distributes across that part of the web face the forces which formerly were concentrated on the web edge.

Preferred embodiment of the invention: a photographic filmstrip contained in a film cartridge includes a perforation defining an elongated edge that is skewed at an acute angle with respect to the longitudinal axis of the film. The cartridge carries follower means, i.e., a retention tooth, disposed to intercept the skewed film edge when the film is advanced through the cartridge. The retention tooth includes an undercut portion which may advantageously comprise first and second inclined abutment facets disposed to overhang respective portions of the web face adjacent the skewed edge when the edge is in initial contact with the tooth. The subsequent application of a force tending to advance the film causes the overhung web face portion to wrap around the undercut part of the tooth to restrict additional advancement of the filmstrip.

Accordingly, it is an object of this invention to provide an improved means for engaging and halting an advancing web.

A further object is to provide a means for engaging an advancing web through contact with a skewed discontinuous edge of the web.

A still further object is to provide means for halting an advancing web by engaging a portion of the web face adjoining such skewed edge.

BRIEF DESCRIPTION OF THE DRAWINGS

Further objects and advantages of the invention will be apparent from the following description taken in conjunction with the accompanying drawings wherein similar reference numerals indicate corresponding parts in all FIGS.

DESCRIPTION OF THE PREFERRED EMBODIMENT

Figure 1:
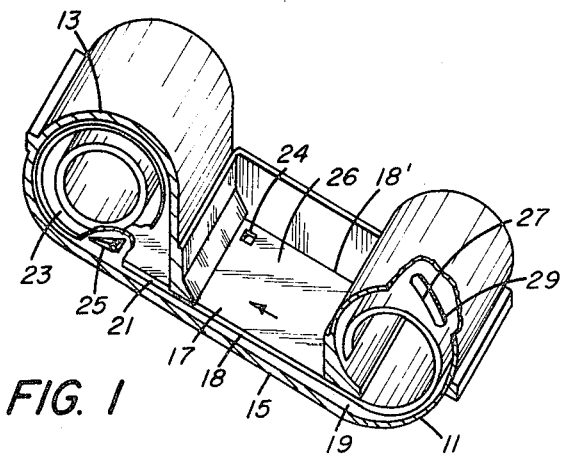
FIG. 1 is a perspective, partially cutaway, view of a film cartridge embodying the subject invention.
Figure 2:
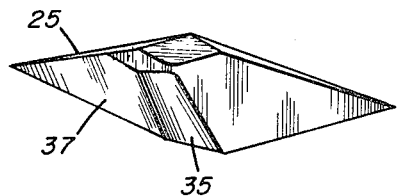
FIG. 2 is a perspective view of a film retention tooth including undercut facets in accordance with the subject invention.
Figure 6:
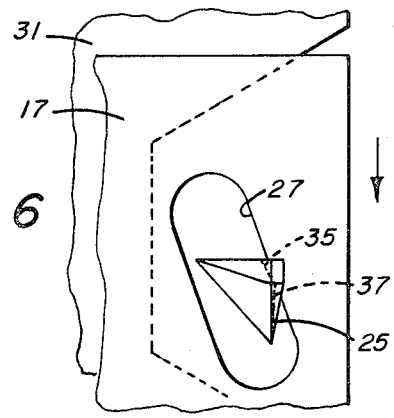
FIG. 6 shows the filmstrip in initial engagement with a retention tooth according to the present invention.
Figure 7:
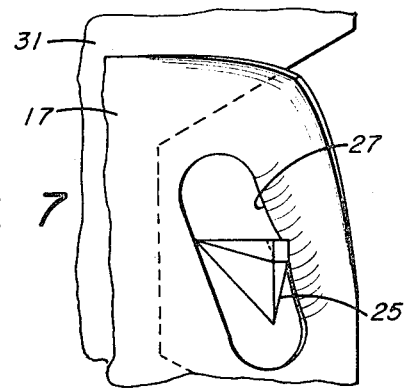
FIG. 7 shows the filmstrip after the application of additional force tending to advance the filmstrip and causing the filmstrip to conformably engage the undercut portion of the tooth.

Although the subject invention may be used in any web guiding system, FIG. 1 depicts a film cartridge illustrative of an environment in which the subject invention may be advantageously employed. As shown therein, the cartridge includes a supply chamber 11 and take-up chamber 13 with a support wall 15 interconnecting the two chambers. A photosensitive filmstrip 17 having generally parallel longitudinal edges 18 and 18' is initially coiled in the supply chamber, the leading end of the filmstrip extending through a supply chamber exit passageway 19, overlying a portion of the support wall 15, and further extending through an access passageway 21 and into the take-up chamber 13. The filmstrip leading end is adhered to a take-up spool 23 rotatably mounted in the take-up chamber. The take-up spool 23 may be placed in driving engagement with a filmstrip advancing mechanism of a camera (not shown), whereby the filmstrip may be wound around the spool and advanced into the take-up chamber. During such advancement suitable film metering means (not shown) in the camera sequentially engages a series of metering perforations 24 to successively register respective image areas of the film-strip for exposure at an exposure station indicated generally at 26. The photosensitive filmstrip may also be accompanied by a strip of light-impervious backing paper 31 (see FIGS. 5-7) which is at least coextensive with, and desirably somewhat longer than, the filmstrip; the backing paper being disposed to lie between the filmstrip 17 and the cartridge wall 15, but being omitted from FIG. 1 for the sake of clarity.

A filmstrip retention tooth 25 in accordance with the present invention is disposed within the take-up chamber and may be integrally formed as a part of one wall thereof. The location of the tooth is not, of course, confined to the take-up chamber but, depending upon the results desired, may be located on any stationary surface over which the filmstrip passes. However, where the tooth is employed in an environment such as described above, i.e., in a film cartridge, it is advisable to locate the tooth so that it rides adjacent one longitudinal edge of the film and is thus outside the photosensitive image areas so as to avoid forming pressure marks on such image areas.

Figure 5:
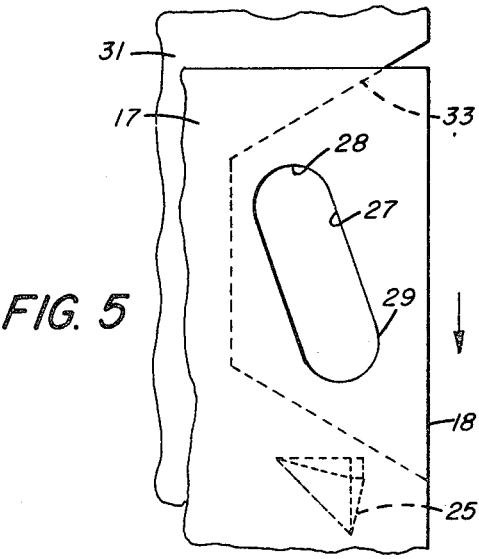
FIG. 5 depicts a filmstrip according to the present invention prior to its engagement with a film retention tooth.

The trailing end of the filmstrip 17 carries a discontinuity, the edge 27 of which faces generally in the direction of filmstrip movement (as shown by arrows in FIGS. 1, 5 and 6) and is skewed to form an acute angle with respect to the longitudinal flimstrip axis. The edge 27 desirably may be formed as an elongated edge of a perforation 29, and is disposed so that its path of travel (see FIG. 5) will cause it to engage the tooth 25 to prevent the trailing film edge from being drawn into the take-up chamber. The ends 28 of the perforation 29 may advantageously be rounded instead of squared so as to reduce the liklihood of web tearing where such ends meet the skewed perforation edges. As is also shown in FIG. 5, if backing paper 31 is present, a suitable cutout 33 may be formed therein to allow the tooth 25 to enter the film perforation 29.

Figure 3:
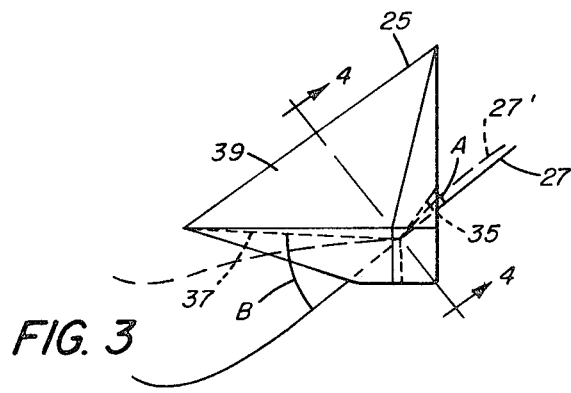
FIG. 3 is a top view of the retention tooth of FIG. 2 in two stages of engagement with a skewed perforation edge.
Figure 4:
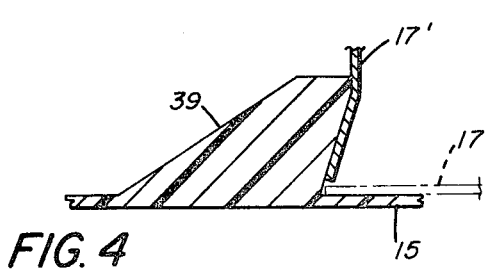
FIG. 4 is a cross section taken along the line 4—4 of FIG. 3.

Upon sufficient filmstrip advancement, the perforation 29 will so embrace the tooth 25 (see FIG. 6) that the skewed edge 27 will abut against the tooth 25, the junction of first and second undercut facets on the tooth (indicated respectively at 35 and 37 in FIG. 3) both contacting the skewed edge 27 and being such as to form with respect to the skewed edge, oppositely directed acute angles A and B. It should be understood that at this point, i.e., just after initial tooth-edge engagement, the filmstrip 17 lies essentially flat against the wall 15 in the manner depicted by dashed lines in FIG. 4. It will also be observed that because of their inclined or slanted relationship with respect to the wall 15, the undercut facets 35 and 37 will, at this point, overhang respective portions of the web adjacent to the perforation edge 27.

Resistance to further filmstrip advancement will, of course, be encountered upon initial tooth-edge engagement. However, if any attempt is made to overpower such engagement, tooth-and film face engagement will come into play: See FIGS. 4 and 7 wherein it is shown that the web —in response to an overpowering advance — is caused to curl up (27', FIG. 3) so that its formerly upward-facing overhung surface conformably engages at least portions of the undercut facets 35 and 37 in the manner depicted at 17' in FIG. 4. Such engagement distributes over the engaged web surface those forces which would otherwise be applied solely against the skewed edge 27 and, in so doing, allows the web to withstand a greater advancing force. In addition, the undercut face 37 tends to prevent the edge 27 from being lifted off tooth 25 as the film 17 is wound onto the core 23.

When it is desired to remove the filmstrip for processing, the trailing end of the film (or of the paper if it is of a greater length than the film), may be grasped adjacent the passageway 21 and pulled from the chamber; the perforation being released from the tooth by riding up the inclined ramp 39.

The invention has been described in detail with particular reference to preferred embodiments thereof, but it will be understood that variations and modifications can be effected within the spirit and scope of the invention.

We claim:

1. In a cartridge for containing photographic filmstrip and having a filmstrip supply chamber, a filmstrip take-up chamber and an exposure station, said cartridge including means for positioning said filmstrip in the direction of the longitudinal axis of said filmstrip and further including follower means for riding against a surface of said filmstrip during positioning thereof, the improvement wherein:

said filmstrip is provided with a discontinuity defining an elongated web edge that is skewed with respect to the direction in which said filmstrip is positionable, said discontinuity being so situated and sized with respect to the widthwise dimensions of said filmstrip that said follower means may engage said discontinuity and ride along said skewed edge as said positionable filmstrip is brought to a stop.

2. The invention according to claim 1 wherein said follower means has a portion that is so undercut that it overhangs a portion of said web adjoining said skewed edge when said follower means is in engagement with said edge.

3. In a film cartridge for holding filmstrip having generally parallel longitudinal edges and an engageable discontinuity proximate one end thereof, said cartridge comprising a take-up compartment, an exposure station, and a supply compartment for holding and paying out filmstrip for movement past said station and into said take-up compartment, said cartridge further comprising means for engaging said discontinuity to limit said filmstrip movement, the improvement wherein:
  a. said discontinuity defines a substantially linear abutment edge facing generally in the direction of said filmstrip movement and disposed to converge in said direction at an acute angle with respect to one of said longitudinal filmstrip edges; and
  b. said engaging means includes means for initially engaging said abutment edge and for engaging, in response to additional filmstrip movement, a portion of the filmstrip surface adjacent said abutment edge to restrict further movement of said filmstrip.

4. The invention according to claim 3 wherein said engaging means comprises a tooth having an undercut portion defining a first abutment face facing generally upstream, said facet being disposed to initially engage said abutment edge at an acute angle therewith and to overhang a first portion of the filmstrip face adjoining said abutment edge whereby additional advancement of said web will cause said first filmstrip portion to conformably engage said facet to restrict further filmstrip movement.

5. The invention according to claim 4 wherein said undercut portion further includes a second abutment facet adjacent said first facet and generally facing said one longitudinal filmstrip edge, said second facet being disposed to initially engage said abutment edge at an acute angle therewith and to overhang a second portion of the filmstrip face adjoining said abutment edge, whereby additional advancement of said filmstrip will cause said second filmstrip portion to conformably engage said second facet.

6. The invention of claim 3 wherein said discontinuity is disposed proximate the trailing end of said filmstrip and is spaced laterally a lesser distance from said one longitudinal filmstrip edge than from the other of said edges.

7. The invention of claim 3 wherein said discontinuity engaging means is disposed within said take-up compartment.

8. For use in a film cartridge of the type having a filmstrip supply chamber, a filmstrip take-up chamber and an exposure station, said cartridge including means for positioning said filmstrip in the direction of the longitudinal axis of said filmstrip and further including follower means for riding against a surface of said filmstrip during positioning thereof, a filmstrip having a perforation defining an elongated filmstrip edge that is skewed with respect to the direction in which said filmstrip is positionable, said perforation being so situated and sized with respect to the widthwise dimensions of said filmstrip that said follower means may enter said perforation and ride along said skewed edge thereof to position said filmstrip in predetermined relation to said follower means.

9. In a system for guiding an elongated web of the type having an aperture therein, said system comprising means for positioning said web in the direction of the longitudinal axis of said web and follower means for riding along a surface of said web during positioning thereof, the improvement wherein:
  said aperture defines an elongated web edge that is skewed with respect to the direction in which said web is positioned, said aperture being so situated with respect to the widthwise dimensions of said web that said follower means may enter said aperture and ride along said skewed web edge to locate said web in predetermined relation to said follower means.

10. The invention in claim 9 wherein said follower means has an undercut portion disposed to overhang a portion of said web adjoining said skewed edge when said follower means is in engagement with said edge.

11. In a system for guiding web material of the type having a generally linear longitudinal edge for movement along a predetermined path in a direction generally parallel to said edge and for engaging said web at a predetermined location to restrict said movement, said system including a guide surface for supporting said web, the improvement wherein:
  a. said web includes a discontinuity defining a substantially linear abutment edge facing generally downstream and disposed to converge downstream at an acute angle with respect to said longitudinal web edge; and
  b. said guide surface carries means disposed within the path of movement of said abutment edge for engaging initially said abutment edge and for engaging, in response to additional web movement, a portion of the web face adjoining said abutment edge to restrict further movement of said web.

12. The invention of claim 11 wherein said engaging means comprises a protuberance having an undercut portion defining a first abutment surface facing generally upstream and overlying a portion of said guide surface, said abutment surface being disposed to initially engage said abutment edge at an acute angle therewith and to overhang a first portion of the web adjoining said abutment edge whereby additional advancement of said web will cause said first web portion to conformably engage said abutment surface to restrict further web movement.

13. The invention of claim 12 wherein said undercut portion further includes a second abutment surface generally facing said longitudinal web edge and overhanging a portion of said guide surface, said second abutment surface being disposed to initially engage said abutment edge at an acute angle therewith and to overlie a second portion of said web adjoining said abutment edge whereby additional advancement of said web will cause said second web portion to conformably engage said second abutment surface.

* * * * *